US006738832B2

(12) United States Patent
Burr et al.

(10) Patent No.: US 6,738,832 B2
(45) Date of Patent: May 18, 2004

(54) METHODS AND APPARATUS IN A LOGGING SYSTEM FOR THE ADAPTIVE LOGGER REPLACEMENT IN ORDER TO RECEIVE PRE-BOOT INFORMATION

(75) Inventors: Michael John Burr, Apex, NC (US); Rajeeta Lalji Shah, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 09/895,459

(22) Filed: Jun. 29, 2001

(65) Prior Publication Data
US 2003/0005183 A1 Jan. 2, 2003

(51) Int. Cl.$^7$ ................................................. G06F 3/00
(52) U.S. Cl. ................................. 710/8; 710/42; 713/1; 709/221
(58) Field of Search ............................... 713/1, 2, 100; 709/220, 221, 222, 223, 224; 710/8, 10, 14, 104, 29, 41, 105, 18

(56) References Cited

U.S. PATENT DOCUMENTS

| 5,170,480 A | * | 12/1992 | Moban et al. ............... 395/600 |
| 5,287,501 A | | 2/1994 | Lomet ......................... 395/600 |
| 5,430,876 A | | 7/1995 | Schreiber et al. ............ 395/650 |
| 5,537,550 A | | 7/1996 | Russell et al. ......... 395/200.11 |
| 5,596,579 A | | 1/1997 | Yasrebi ....................... 395/678 |
| 5,654,905 A | * | 8/1997 | Mulholland et al. ........ 364/569 |
| 5,737,399 A | | 4/1998 | Witzman et al. ............ 379/112 |
| 5,765,157 A | | 6/1998 | Lindholm et al. .......... 707/101 |
| 5,787,281 A | | 7/1998 | Schreiber et al. ........... 395/684 |
| 5,857,190 A | | 1/1999 | Brown ......................... 707/10 |
| 5,881,230 A | | 3/1999 | Christensen et al. ... 395/200.33 |
| 5,881,315 A | | 3/1999 | Cohen ......................... 395/872 |
| 5,892,944 A | | 4/1999 | Fukumoto et al. .......... 395/670 |
| 5,943,675 A | | 8/1999 | Keith et al. ................. 707/201 |
| 6,012,100 A | * | 1/2000 | Frailong et al. ............. 709/224 |
| 6,070,197 A | | 5/2000 | Cobb et al. .................. 709/303 |
| 6,125,382 A | | 9/2000 | Brobst et al. ................ 709/102 |
| 6,125,392 A | * | 9/2000 | Labatte et al. .............. 709/224 |
| 6,154,741 A | | 11/2000 | Feldman ......................... 707/9 |
| 6,205,465 B1 | | 3/2001 | Schoening et al. .......... 709/102 |
| 6,212,653 B1 | | 4/2001 | Boivin et al. ................. 714/45 |
| 6,430,616 B1 | * | 8/2002 | Brinnand et al. ........... 709/224 |

FOREIGN PATENT DOCUMENTS

WO    WO 00/47003    9/2000    ............ H04Q/3/00

OTHER PUBLICATIONS

IBM Technical Disclosure Bulletin, vol. 40, No. 03, Mar. 1997, "Design for a Simple Network Management Protocol Subagent for Internet Firewalls", pp. 63–68.
"Kernel: Re: Kernel Log Channel Not Stored to ems.log", May 10, 2001, pp. 1–2.
IBM Technical Disclosure Bulletin, "Logging of Power–On Self–Test Errors", Nov. 1990, pp. 340–342.
Sun Microsystems, Inc., "Java Logging APIs", Oct. 18, 2000, pp. 1–81.

* cited by examiner

Primary Examiner—Jeffrey Gaffin
Assistant Examiner—Rijue Mai
(74) Attorney, Agent, or Firm—Duke W. Yee; Jeffrey S. LaBaw; Stephen J. Walder, Jr.

(57) ABSTRACT

A method, system, and computer program product for logging events in a data processing system is provided. In one embodiment, responsive to a determination that a situation exists preventing a primary logger from executing a logging task, a swappable adaptive logger is created, which in turn is pointed to a boot logger created by a swappable adaptive log engine. Event information is then logged to the boot logger. For example, the boot logger may write event information to memory or to a file if the logging database is unavailable. When the primary logger becomes configured and functional, the swappable adaptive logger swaps the boot logger for the primary logger and begins writing event information to the primary logger.

18 Claims, 6 Drawing Sheets

METHODS AND APPARATUS IN A LOGGING SYSTEM FOR THE ADAPTIVE LOGGER REPLACEMENT IN ORDER TO RECEIVE PRE-BOOT INFORMATION

CROSS REFERENCE TO RELATED APPLICATIONS

The present application is related to co-pending U.S. patent application Ser. No. 09/891,504 entitled "METHOD AND APPARATUS FOR DYNAMIC CONFIGURABLE LOGGING OF ACTIVITIES IN A DISTRIBUTED COMPUTING SYSTEM", to co-pending U.S. patent application Ser. No. 09/895,116 entitled "METHODS AND APPARATUS IN INFORMATION MANAGEMENT SYSTEM PROVIDING ADDING DATA AND BOOKMARKS TO EXISITING INFORMATION LOGGED", to co-pending U.S. patent application Ser. No. 09/895,979 entitled "METHODS AND APPARATUS IN A LOGGING SYSTEM FOR THE TRACKING OF TASKS SOLELY BASED ON FUNCTION FOR DATA ANALYSIS", and to co-pending U.S. patent application Ser. No. 09/895,229 entitled "METHODS AND APPARATUS IN DISTIBUTED REMOTE LOGGING SYSTEM FOR REMOTE ADHOC DATA ANALYSIS CUSTOMIZED WITH MULTILEVEL HIERARCHICAL LOGGER TREE" filed even date herewith. The content of the above mentioned commonly assigned, co-pending U.S. patent applications are hereby incorporated herein by reference for all purposes.

BACKGROUND OF THE INVENTION

1. Technical Field

The present invention relates generally to computer network environments, and more specifically to logging services in distributed, multilevel architectures.

2. Description of Related Art

Computers have come to epitomize modern life. Today, computers are used for much more than simply computing. For example, banking transactions are often conducted through automated teller machines (ATMs) connected via networks to central processing centers that keep track of transactions while computerized telephone switching systems manage the millions of calls generated each day. Furthermore, computers are integral to both peoples personal life as well as to their business life.

As computers became more widespread in the workplace, new ways to harness their potential developed. Thus, with increasing use of computers for tasks other than simple computing has come an increase in complexity. Furthermore, as computers are increasingly networked together to provide even more functionality, that complexity is increased exponentially. To keep these networked computers operating and, therefore, ensure that ATM transactions, telephone calls, and business continue to operate smoothly, requires the work of administrators to monitor the systems and correct errors as they occur.

One tool that aids administrators in keeping networks operational is logging. Logging is the process of recording system events so that those actions can be reviewed later. Thus, if an error occurs, that error may be logged with other information to allow an administrator to discover the source of the problem and correct it. However, currently, logging is not available during certain periods when the logging depends on a component that is not ready. This occurs during the time period prior to initialization of all the components needed, such as during hardware firmware BIOS boot, native OS boot, JVM boot, ORB boot, prior to initialization of components needed by the logging system, and during initialization of the logging system. This state also occurs during the time period for which the network has failed or some other failure event yields component dependencies. Another situation in which logging messages to a logging component cannot be accomplished is when the caller is not allowed to call the callee. This is to prevent the case where one component that is used by logging is not reentrant (config calls logger which calls config). Global locking approach until all dependencies are satisfied is not an option since messages are desired from all components in all stages of a distributed boot of kernel services. Therefore, it would be desirable to have a logging system that is capable of logging during initialization periods and situations in which the a component cannot be called by the logger.

SUMMARY OF THE INVENTION

The present invention provides a method, system, and computer program product for logging events in a data processing system. In one embodiment, responsive to a determination that a situation exists preventing a primary logger from executing a logging task, a swappable adaptive logger is created, which in turn is pointed to a boot logger created by a swappable adaptive log engine. Event information is then logged to the boot logger. For example, the boot logger may write event information to memory or to a file if the logging database is unavailable. When the primary logger becomes configured and functional, the swappable adaptive logger swaps the boot logger for the primary logger and begins writing event information to the primary logger.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
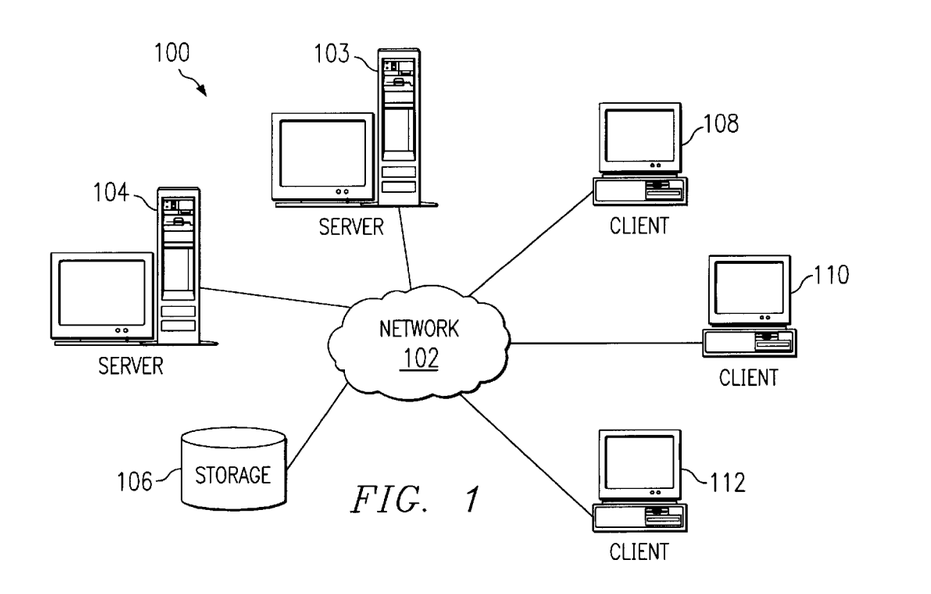
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a plurality of servers 103–104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to servers 103–104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
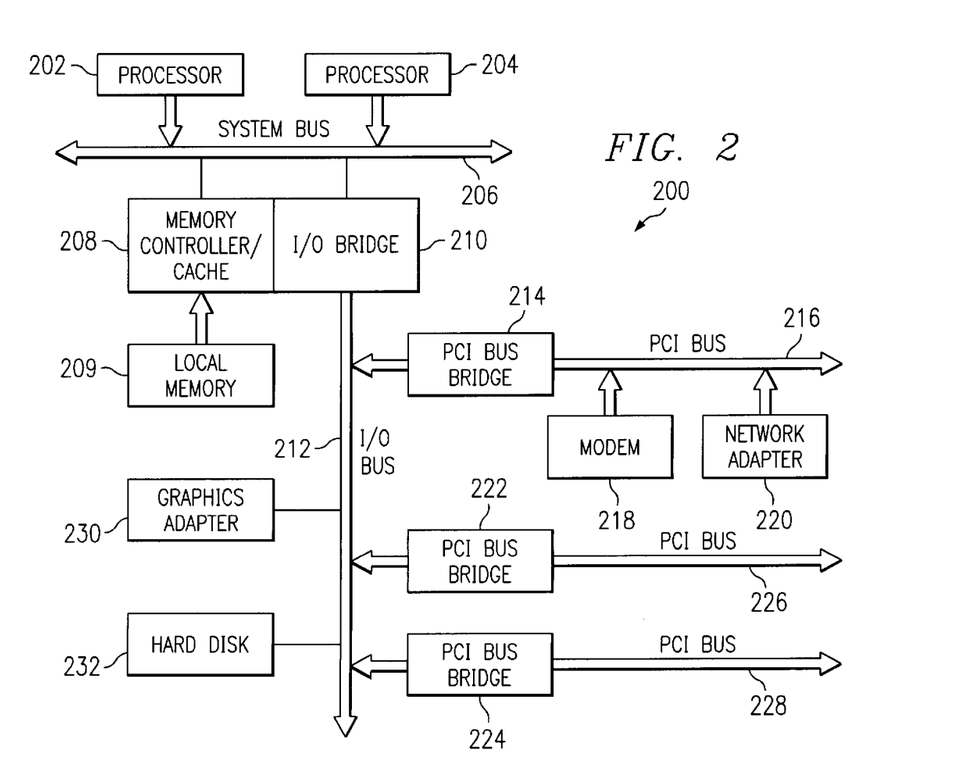
FIG. 2 depicts a block diagram of a data processing system that may be implemented as a server in accordance with a preferred embodiment of the present invention.

Referring to FIG. 2, a block diagram of a data processing system that may be implemented as a server, such as servers 103–104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
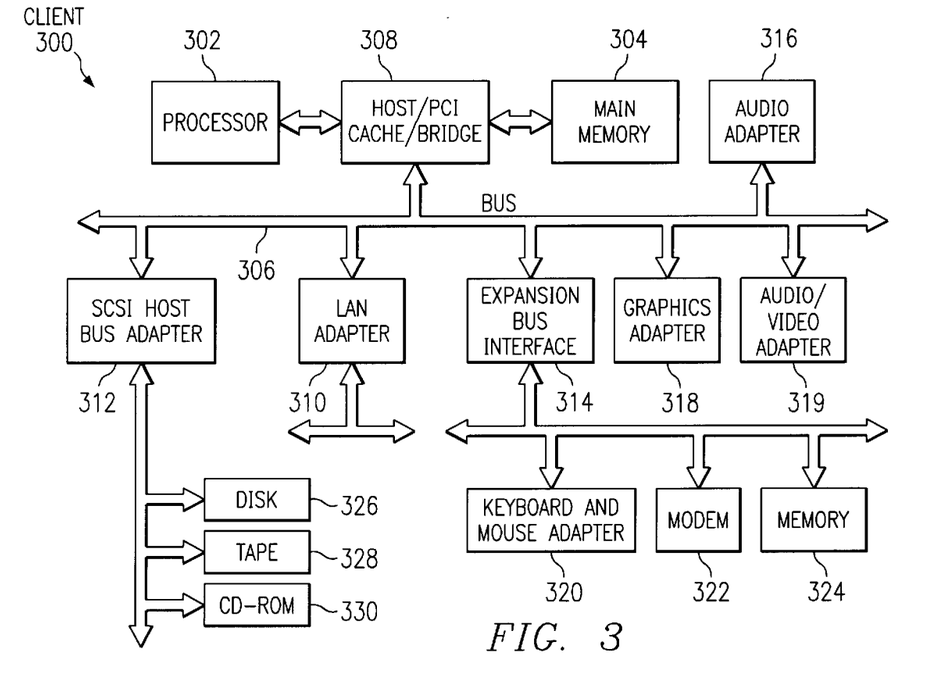
FIG. 3 depicts a block diagram illustrating a data processing system is depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a logging system with distributed, multilevel architecture which allows remote control of logging elements. The present invention also allows the logging system to be used standalone or in a distributed environment. The logging system allows a system to produce large amounts of data for local consumption, as opposed to a small amount of data for storage in a central remote repository. Dual output is easily configured for an administrator wishing to see logs on the console, in multiple files and in a database for future queries.

Figure 4:
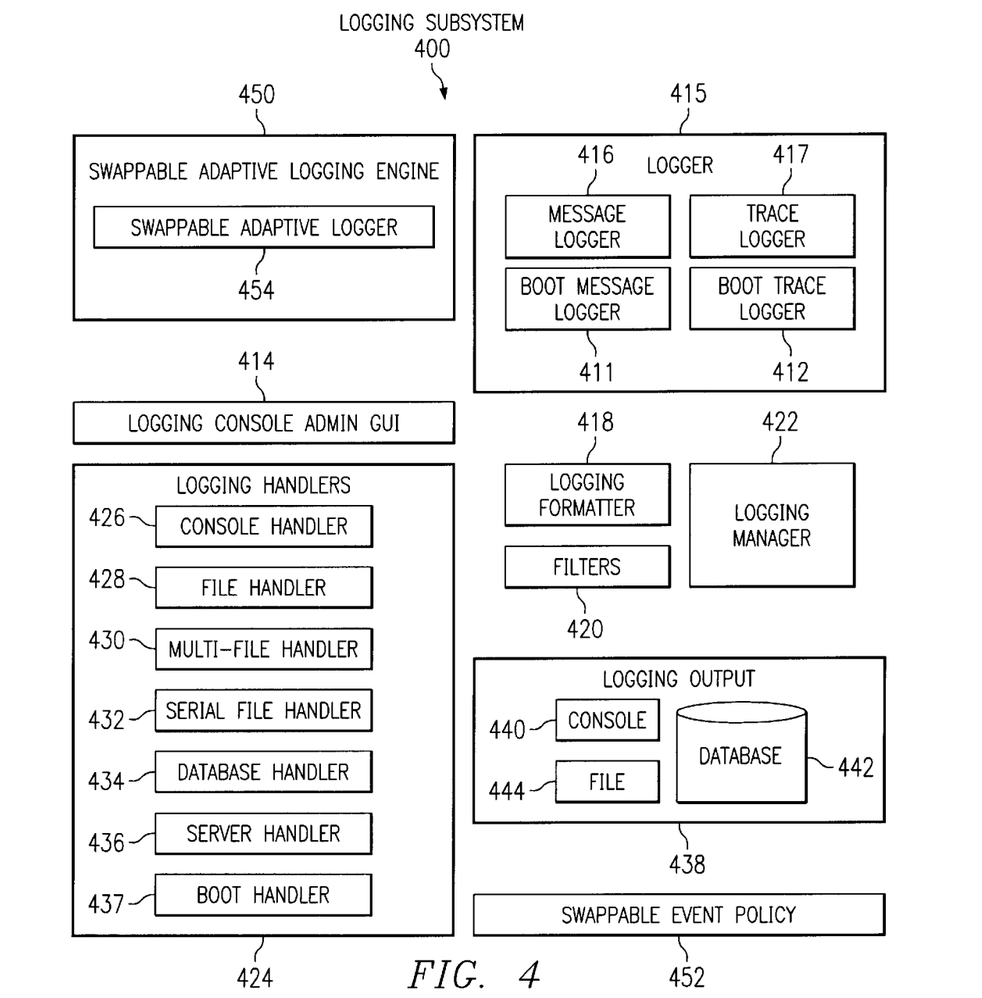
FIG. 4 depicts a block diagram of a logging subsystem in accordance with the present invention.

With reference now to FIG. 4, a block diagram of a logging subsystem is depicted in accordance with the present invention. The logging subsystem 400 uses several objects to record system events. These objects include loggers 415, logging handlers 424, logging filters 420 (also referred to as masks), and logging formatters 418. Log subsystem 400 also includes, a logging console administrator graphical user interface (GUI) 414, a logging manager 422, logging output 438, a swappable adaptive logging engine (SLE) 450, and swappable event policy (SEP) 452.

The swappable adaptive logging engine 450 creates a swappable adaptive logger 454 which is accessed by an application program to perform logging functions during boot time and other times when a fully configured and functional logger is not available, such as, for example, due to the fact that the database 442 has not finished being configured during initialization. The swappable adaptive logger points to a boot logger 411–412 during these times when the fully configured and functional logger 416–417 is not available and when the fully configured and functional logger 416–417 becomes available, the swappable adaptive logger is switched to point at the fully configured and functional logger 416–417. However, to the application program this switching between loggers is invisible. The application program continues to point to the swappable adaptive logger. SEP 452 determines when a swappable adaptive logger 454 should be created and when the swappable adaptive logger should switch between a boot logger 411–412 and a fully configured and functional logger 416–417.

Loggers 415 are software objects that record events that occur while a component is operating. The Logging subsystem 400 supports two types of loggers 415: message loggers 416 and trace Loggers 417. Message loggers 416 are used to record textual messages from a component. These messages are internationalized for individual locales. Trace loggers 417 are used to capture information about the operating environment when component code fails to operate as intended. Support personnel use the information captured by trace loggers 417 to trace a problem to its source or to determine why an error occurred. Generally, this information is not enabled by default. Because trace messages are intended for support personnel, they are generally written to a file that can be viewed during a postmortem Examination. Additionally, logger 415 includes a boot message logger 411 and a boot trace logger 412 which are created and used by the swappable adaptive logger 454 when a fully configured and functional logger is not available.

Handlers 424 are software objects that direct messages recorded by a logger to a logging output 438 destination. Messages can be directed to a file 444, a database 442, a console screen 440, or to other destinations. One associates handlers 424 with loggers 415 to send information recorded by a logger 415 to the desired destination. The present invention provides the configuration definitions for the following types of handlers:

Console Handler 426 writes log records to a console.
File Handler 428 writes log records to a file.
Multifile Handler 430 writes log records to a rotating set of log files.
Serial File Handler 432 writes log records to files as serialized objects.
Database Handler 434 writes log records to a database.
Server Handler 436 sends log records in batch mode to a remote logging server for processing.
Boot Handler 437 writes log records to a file or to memory.

Filters 420 can be applied to loggers, to handlers 424, or to both loggers and handlers. When applied to a logger, the filter determines which types of message and trace records the logger 415 processes. When applied to a handler 424, the filter 420 determines which types of message and trace records the handler 424 sends to a destination. Filters 420 work by comparing a log record type against a set of criteria, or a query, contained within the filter.

Formatters 418 are software objects used to format the output of information contained in log records. In general, formatters 418 can be used to tailor things like date and time stamps to local conventions. A single formatter 418 can be used by multiple handlers 424. Having numerous loggers 416, handlers 424, filters 420, and formatters 418 can cause an undue amount of logging administration to perform. To reduce the administration burden, one can create "groups".

A group contains loggers, handlers, filters, or formatters that have common properties. By creating groups, a newly created logger, handler, filter, or formatter with unset properties can inherit values for those properties from the group. If a logger, handler, filter, or formatter belongs to a group and its properties are updated, all other loggers, handlers, filters or formatters in that group will also have that property updated. This eliminates the need for manually updating individual logger, handler, filter, or formatter properties.

The logging manager 422 provides an interface to Object Request Brokers (ORBs) as well as configuration and other DKS services. (An ORB is software that handles the communication of messages from a requesting program (client) to the object as well as any return values from the object back to the calling program.) The logging console Graphical User Interface (GUI) provides an interface to allow an administrator to provide configuration information as well as to output messages to the administrator.

Figure 5:
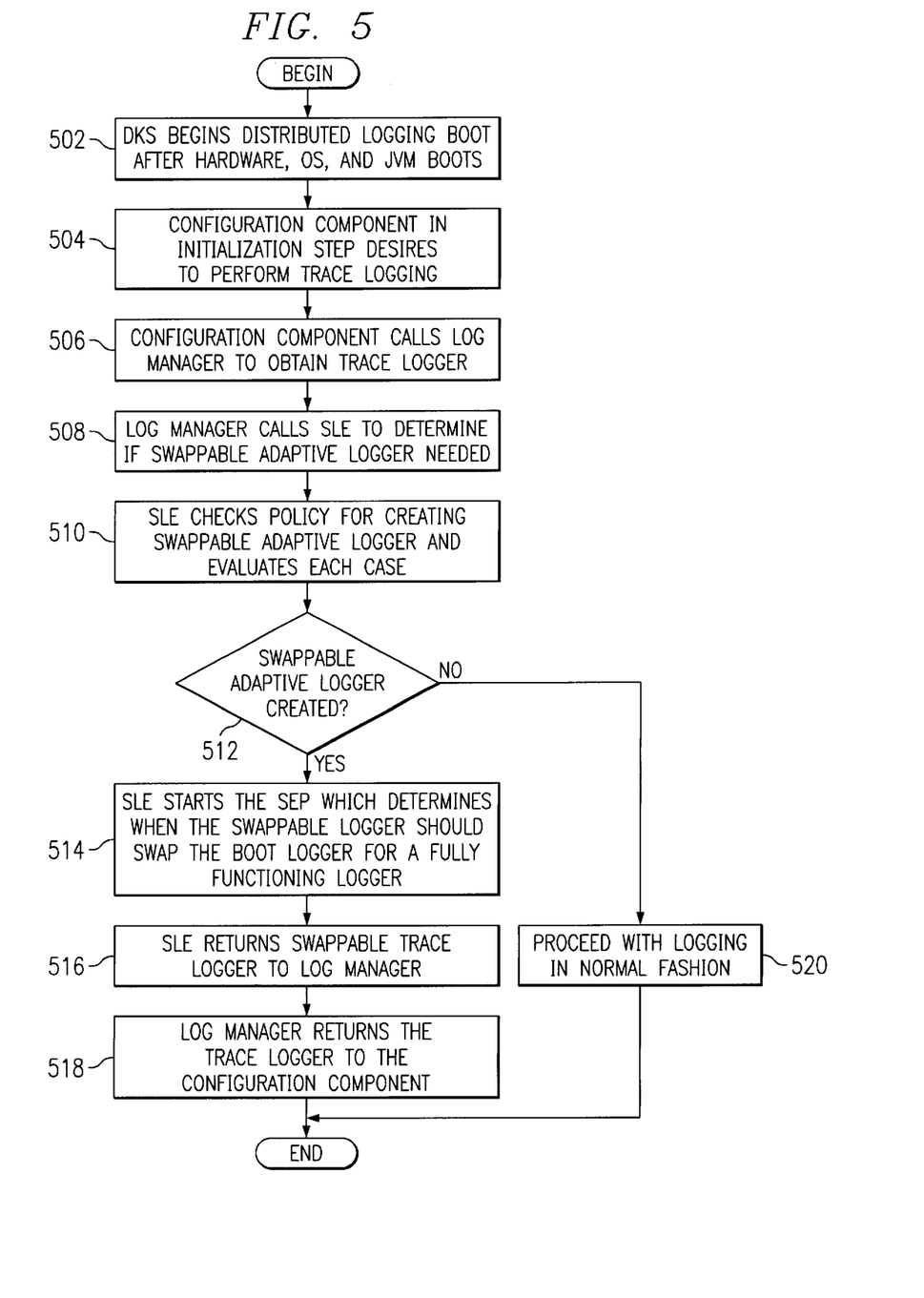
FIG. 5 depicts a process flow and program function for determining when to use a boot logger in accordance with the present invention.

With reference now to FIG. 5, a process flow and program function for determining when to use a swappable adaptive logger is depicted in accordance with the present invention. To begin, Distributed Kernel Services (DKS) begins distributed logging boot after the hardware, operating system (OS), and Java Virtual Machine (JVM) have booted (e.g. initialized) (step 502). Next, if a configuration component in the initialization step desires to perform trace logging (step 504), then the configuration component calls the log manager to obtain a trace logger (step 506). The log manager calls the SLE to determine if a swappable adaptive logger is needed (step 508). The SLE checks swappable event policy (SEP) for creating a swappable adaptable logger and evaluates each case (step 510). Next, it determines whether a swappable adaptive logger needs to be created (step 512). If a swappable adaptive logger is needed, create it, otherwise proceed with logging in a normal fashion (step 520). If a boot logger and boot handler have been created and the handler attached to the boot logger, then the SLE starts the SEP which determines when the swappable adaptive logger should swap the boot logger for a fully functioning logger, such as, for example, message logger 416 or trace logger 417 (step 514). The SLE then returns the swappable trace logger to the log manager (step 516) and the log manager returns the trace logger to the configuration component (step 518).

Figure 6:
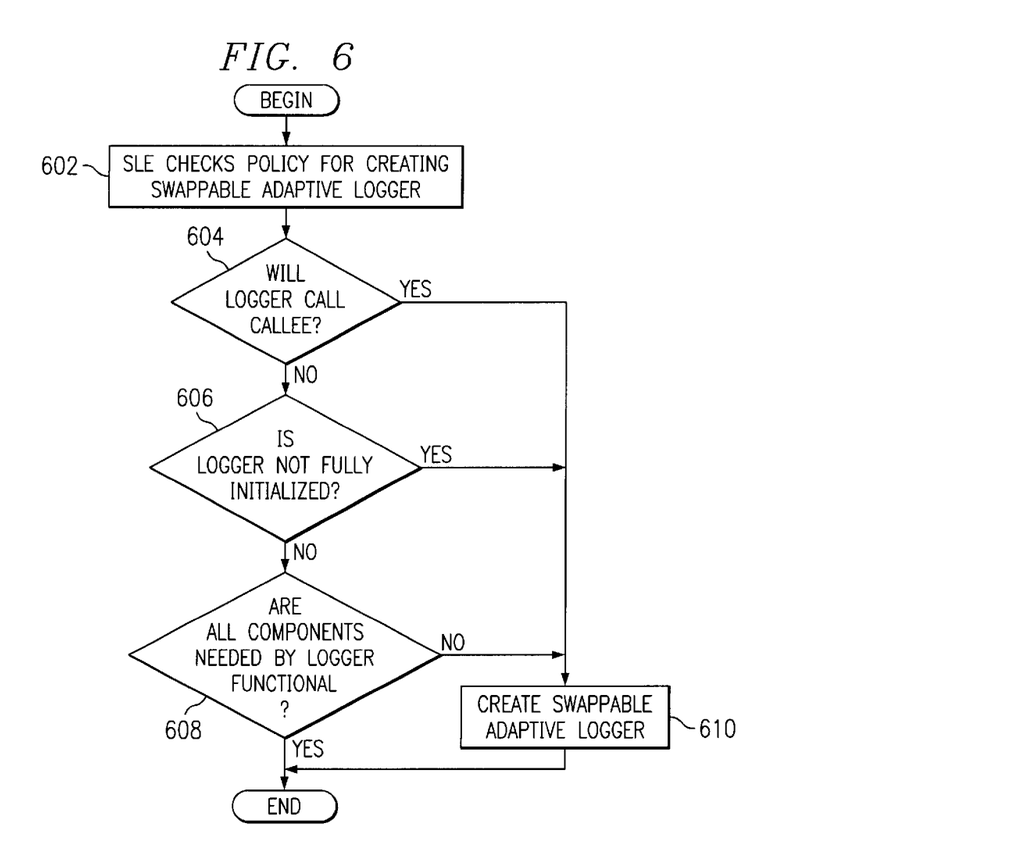
FIG. 6 depicts a process flow and program function in a SLE for determining whether a boot logger should be created in accordance with the present invention.

With reference now to FIG. 6, a process flow and program function in a SLE for determining whether a boot logger should be created is depicted in accordance with the present invention. The processes and functions depicted in FIG. 6 provide more details about steps 510–512 in FIG. 5. To begin, the SLE checks the policy for creating a boot logger (step 602). The SLE determines whether the logger will call the callee (step 604). If yes, then the SLE creates a boot logger (step 610).

If the SLE determines that the logger will not call the callee, then the SLE determines whether the logger is not fully initialized (step 606). This may occur, for example, when the configuration is not available of it the database in not ready. For example, if the database is not ready, then a file or memory may be used instead. If the SLE determines that the logger is not fully initialized, then the SLE creates a boot logger (step 610). If the SLE determines that the logger is fully initialized, then the SLE determines whether all components needed by the logger are functional (step 608). If not all components needed by the logger are functional, then the SLE creates a boot logger (step 610). If all components needed by the logger are functional, then a boot logger is not created.

Figure 7:
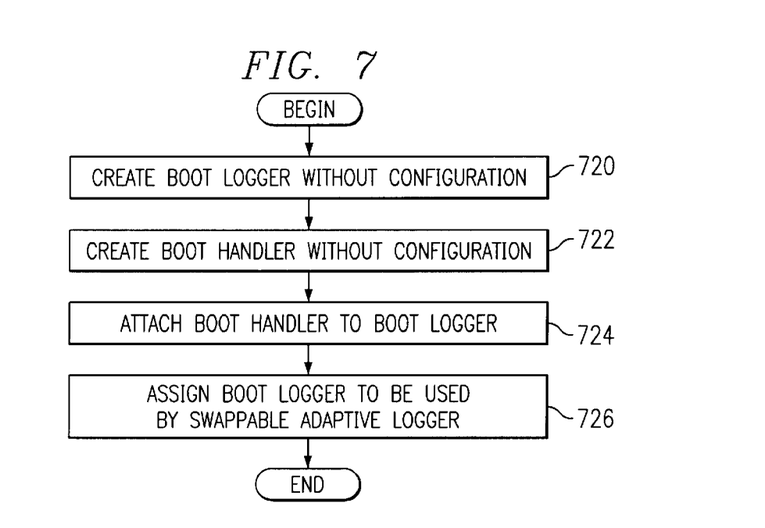
FIG. 7 depicts a process flow and program function for creating boot logger in accordance with the present invention.

With reference now to FIG. 7, a process flow and program function for creating a boot logger is depicted in accordance with the present invention. To begin, the SLE creates a boot logger without configuration (step 720) and the creates a boot handler without configuration (step 722). The boot handler is then attached to the boot logger (step 724) and the boot logger assigned to be used by the swappable adaptive logger (step 726).

Figure 8:
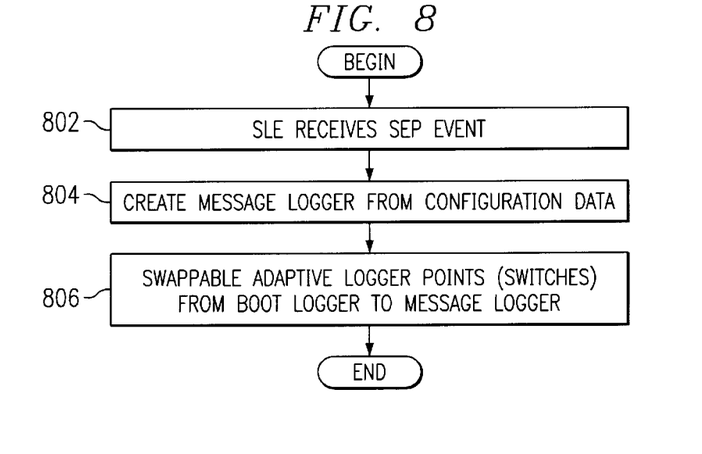
FIG. 8 depicts an exemplary process flow and program function illustrating when the swappable adaptive logger should switch to the fully configured and functional logger in accordance with the present invention.

With reference now to FIG. 8, an exemplary process flow and program function for changing from the swappable adaptive logger to the fully configured and functional logger is depicted in accordance with the present invention. To begin, the SLE receives an SEP event (step 802). An SEP event is an event which indicates that the logger is fully configured. For example, an SEP event could be that the logging output database has been initialized. A message logger is then created from configuration data (step 804). The swappable adaptive logger is then pointed (i.e. switched) from the boot logger to the message logger (step 806). Thus, the boot logger has been replaced by the message logger.

Alternatively, the process can be implemented in reverse. In this case, an SEP event is an event that indicates that the logger is not fully configured. For example, an event indicating that a component requesting logging will itself be called by the logger. In that case the logger may not be used, but rather a swappable logger must be used instead that does not need to call the callee. Thus, if an SEP event indicating that the logger is no longer fully configured is received, then the swappable adaptive logger is then pointed from the message logger to the boot logger.

Figure 9A:
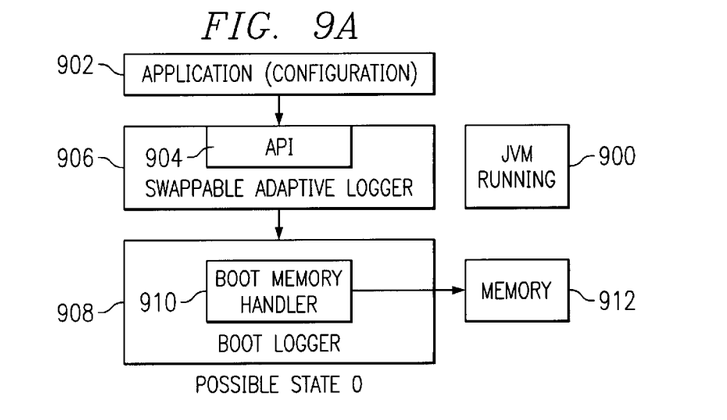
FIGS. 9A–9C depict block diagrams illustrating three possible states of the data processing system for logging purposes in accordance with the present invention.
Figure 9B:
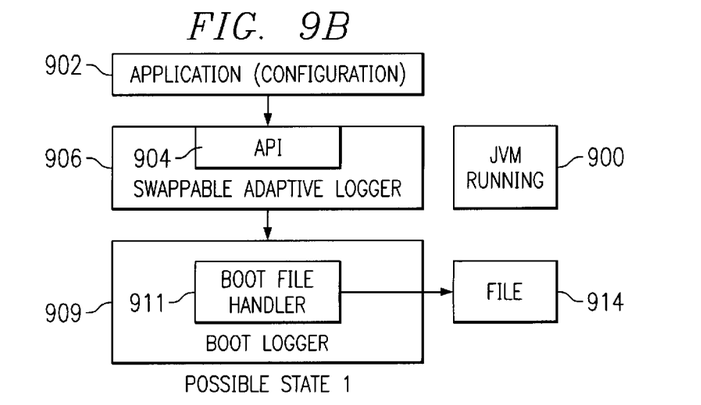
Figure 9C:
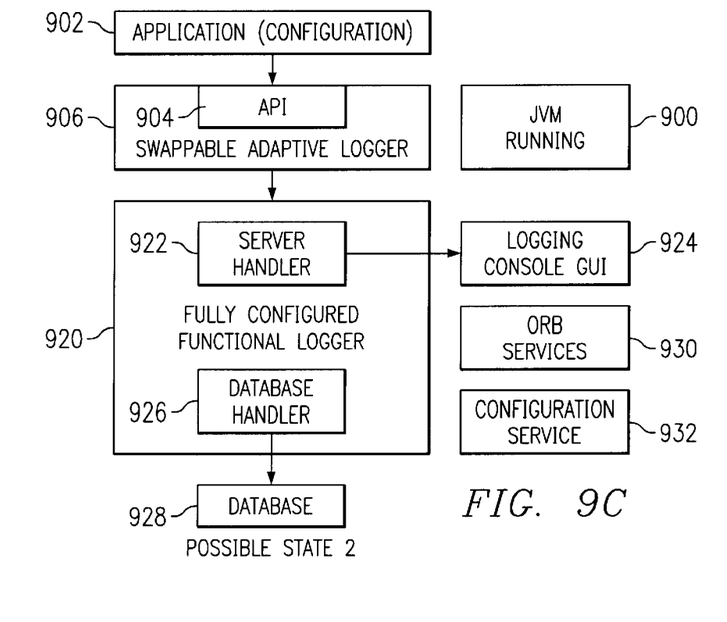

With reference now to FIGS. 9A–9C, block diagrams illustrating three possible states of the data processing system for logging purposes are depicted in accordance with the present invention. FIG. 9A depicts possible state 0 in which the logger is not fully configured and functional. The JVM is running 900 and an application 902 calls a log manager API 904 that creates a swappable adaptive logger 906 using the log SLE. The SLE creates boot logger 908, a boot handler memory 910, attaches boot logger 908 to boot memory handler 910, and assigns the boot logger 908 to the swappable adaptive logger 906. Boot memory handler 910 provides an interface to input/output. In possible state 0, the logging database has not been configured nor has the file system, thus, boot memory handler 910 provides an interface to memory 912 and boot logger 908 writes trace or message logs, as the case may be, to memory 912. Once the file system has been initialized, the contents of memory 912 may be copied into file 914, or alternatively, once a fully configured and functional logger 920 is available, the contents of memory 912 may be copied into database 928.

In FIG. 9B, possible state 1 shows an identical situation to possible state 0 except that in this case, the file system has been initialized. Thus, swappable adaptive logger 906 now points to boot logger 909 which includes a boot file handler 911. Thus, boot file handler 911 provides an interface to file 914 and boot logger 909 writes logs to file 914. Once the fully configured and functional logger 920 is available, the contents of file 914 may be copied into database 928.

In FIG. 9C, possible state 2 is illustrated. In this situation, the logging system is fully configured and functional. The JVM 900 is running as are the ORB services 930 and the configuration services 932. The swappable adaptive logger 906 now points to the fully configured functional logger 920 rather than the boot logger 908. The fully configured functional logger 920 includes a server handler 922 that provides and interface between the fully configured functional logger 920 and a logging console GUI 924. The fully configured functional logger 920 also includes a database handler 926 that provides an interface between the fully configured functional logger 920 and a logging database 928. Thus, logging information may be written to database 928 and also may be presented to a user through logging console GUI 924.

Therefore, the application always points to the swappable adaptive logger 906 and does not need to make any changes based on the status of the system. All changes to loggers are performed by the swappable adaptive logger 906. The swappable adaptive logger 906 points to various loggers based on the status of the system. Thus, when the file system and database are not available, the swappable adaptive logger 906 points to a boot logger that is attached to a boot memory handler 910 for writing log information to memory 912 as depicted in FIG. 9A. When the file system becomes available, the swappable adaptive logger swaps boot logger 908 for boot logger 909 which is attached to boot file handler 911 for writing log information to file 914 as depicted in FIG. 9B. When the logging system is completely configured and functional as depicted in FIG. 9B, the swappable adaptive logger switches from boot logger 909 to fully configured functional logger 920, thus allowing use of the database 928 and logging console GUI 924.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for logging events in a data processing system, the method comprising:
    responsive to a determination that a situation exists preventing a primary logging system from executing a logging task, creating a boot logger;
    logging event information using the boot logger; and
    responsive to a determination that a primary logger is capable of accepting the event information, swapping the primary logger for the boot logger such that the primary logger begins logging event information.

2. The method as recited in claim 1, wherein the situation is one of the primary logger is not fully initialized, all components needed by the primary logger are not functional, and the primary logger is required to call a component that has requested the primary logger.

3. A method for logging events in a data processing system, the method comprising:
    responsive to a determination that a situation exists preventing a primary logging system from executing a logging task, creating a boot logger;
    logging event information using the boot logger;
    responsive to a determination that a primary logger is capable of accepting the event information, swapping the primary logger for the boot logger such that the primary logger begins logging event information; and
    responsive to a determination that a logging database is unavailable and responsive to a determination that a file system is available, creating a boot file handler, attaching the boot file handler to the boot logger, and writing logging information to a file.

4. The method as recited in claim 3, further comprising:
    responsive to the logging database becoming available, transferring logging information from the file to the logging database.

5. A method for logging events in a data processing system, the method comprising:
    responsive to a determination that a situation exists preventing a primary logging system from executing a logging task, creating a boot logger;
    logging event information using the boot logger;
    responsive to a determination that a primary logger is capable of accepting the event information, swapping the primary logger for the boot logger such that the primary logger begins logging event information; and
    responsive to a determination that a logging database is unavailable and responsive to a determination that a file system is unavailable, creating a boot memory handler, attaching the boot memory handler to the boot logger, and writing logging information to a memory unit.

6. The method as recited in claim 5, further comprising:
    responsive to the logging database becoming available, transferring logging information from the memory unit to the logging database.

7. A computer program product in a computer readable media for use in a data processing system for logging events in a data processing system, the computer program product comprising:
    first instructions, responsive to a determination that a situation exists preventing a primary logging system from executing a logging task, for creating a boot logger;
    second instructions for logging event information using the boot logger; and
    third instructions, responsive to a determination that a primary logger is capable of accepting the event information, for swapping the primary logger for the boot logger such that the primary logger begins logging event information.

8. The computer program product as recited in claim 7, wherein the situation is one of the primary logger is not fully initialized, all components needed by the primary logger are not functional, and the primary logger is required to call a component that has requested the primary logger.

9. A computer program product in a computer readable media for use in a data processing system for logging events in a data processing system, the computer program product comprising:
    first instructions, responsive to a determination that a situation exists preventing a primary logging system from executing a logging task, for creating a boot logger;
    second instructions for logging event information using the boot logger;
    third instructions, responsive to a determination that a primary logger is capable of accepting the event information, for swapping the primary logger for the boot logger such that the primary logger begins logging event information; and
    fourth instructions, responsive to a determination that a logging database is unavailable and responsive to a determination that a file system is available, for creating a boot file handler, attaching the boot file handler to the boot logger, and writing logging information to a file.

10. The computer program product as recited in claim 9, further comprising:
    fifth instructions, responsive to the logging database becoming available, for transferring logging information from the file to the logging database.

11. A computer program product in a computer readable media for use in a data processing system for logging events in a data processing system, the computer program product comprising:
    first instructions, responsive to a determination that a situation exists preventing a primary logging system from executing a logging task, for creating a boot logger;

second instructions for logging event information using the boot logger; and third instructions, responsive to a determination that a primary logger is capable of accepting the event information, for swapping the primary logger for the boot logger such that the primary logger begins logging event information; and fourth instructions, responsive to a determination that a logging database is unavailable and responsive to a determination that a file system is unavailable, for creating a boot memory handler, attaching the boot memory handler to the boot logger, and writing lagging information to a memory unit.

12. The computer program product as recited in claim 11, further comprising:

fifth instructions, responsive to the logging database becoming available, for transferring logging information from the memory unit to the logging database.

13. A system for logging events in a data processing system, the system comprising:

a swappable adaptive event logging engine which, responsive to a determination that a situation exists preventing a primary logging system from executing a logging task, creates a boot logger; and a swappable adaptive logger which uses the boot logger to log event information; wherein responsive to a determination that a primary logger is capable of accepting the event information, the swappable adaptive logger swaps the boot logger for the primary logger and uses the primary logger to log event information.

14. The system as recited in claim 13, wherein the situation is one of the primary logger is not fully initialized, all components needed by the primary logger are not functional, and the primary logger is required to call a component that has requested the primary logger.

15. A system for logging events in a data processing system, the system comprising:

A swappable adaptive event logging engine which, responsive to a determination that a situation exists preventing a primary logging system from executing a logging task, creates a boot logger;

a swappable adaptive logger which uses the boot logger to log event information; wherein responsive to a determination that a primary logger is capably of accepting the event information, the swappable adaptive logger swaps the boot logger for the primary logger and uses the primary logger to log event information; and wherein the swappable adaptive logger, responsive to a determination that a logging database is unavailable and responsive to a determination that a file system is available, creates a boot file handler, attaches the boot file handler to the boot logger, and writes logging information to a file.

16. The system as recited in claim 15, wherein the swappable adaptive logger, responsive to the logging database becoming available, transfers logging information from the file to the logging database.

17. A system for logging events in a data processing system, the system comprising:

A swappable adaptive event logging engine which, responsive to a determination that a situation exists preventing a primary logging system from executing a logging task, creates a boot logger;

a swappable adaptive logger which uses the boot logger to log event information; wherein responsive to a determination that a primary logger is capable of accepting the event information, the swappable adaptive logger swaps the boot logger for the primary logger and uses the primary logger to log event information; and wherein the swappable adaptable logger, responsive to a determination that a logging database is unavailable and responsive to a determination that a file system is unavailable, creates a boot memory handler, attaches the boot memory handler to the boot logger, and writes logging information to a memory unit.

18. The system as recited in claim 17, wherein the swappable adaptive logger, responsive to the logging database becoming available, transfers the logging information from the memory unit to the logging database.

* * * * *

UNITED STATES PATENT AND TRADEMARK OFFICE
CERTIFICATE OF CORRECTION

PATENT NO. : 6,738,832 B2 Page 1 of 1
APPLICATION NO. : 09/895459
DATED : May 18, 2004
INVENTOR(S) : Burr et al.

It is certified that error appears in the above-identified patent and that said Letters Patent is hereby corrected as shown below:

Col. 11, line 12: after "writing" delete "lagging" and insert --logging--.

Col. 12, line 4: before "of accepting" delete "capably" and insert --capable--.

Signed and Sealed this

First Day of May, 2007

JON W. DUDAS
*Director of the United States Patent and Trademark Office*